Feb. 17, 1953 M. H. FRISBIE 2,628,998
SPLITTABLE CABLE WITH VISIBLE CONDUCTORS
Filed Nov. 8, 1945
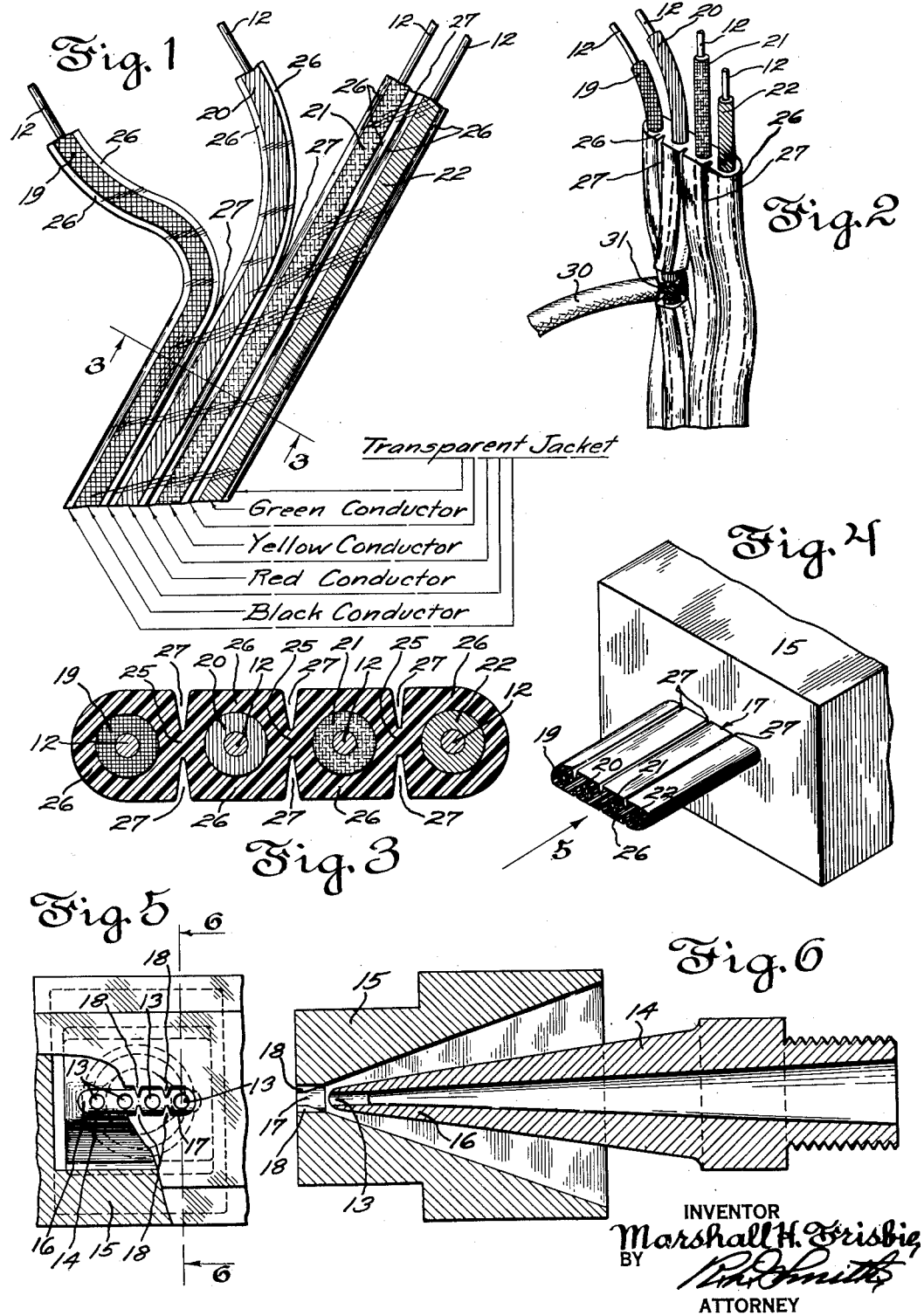
INVENTOR
Marshall H. Frisbie
BY
ATTORNEY Patented Feb. 17, 1953

2,628,998

UNITED STATES PATENT OFFICE 2,628,998

SPLITTABLE CABLE WITH VISIBLE CONDUCTORS

Marshall H. Frisbie, Hamden, Conn., assignor to The A. C. Gilbert Company, New Haven, Conn., a corporation of Maryland Application November 8, 1945, Serial No. 627,480

4 Claims. (Cl. 174—112)

This invention relates to electric cables having insulated harnesses or jackets and to methods of producing same, and particularly concerns a cable harness that enables any particular conductor or conductors inside the cable to be individually identified as well as selectively separated out from the rest of the cable without the use of tools and without stripping the harness from the cable. A need for cables incorporating the present improvements is typified in toy electric railway systems wherein by practice of this invention the usual troublesome and disorderly tangle of small size wires is avoided and composed into neat and appealing runs of what may appropriately be termed "Rainbow" cable because made of strands whose differing colors are rendered fully visible by embedding them in a flexible band of transparent homogeneous material.

In cables of solid substance as heretofore constructed it has not been possible to identify an objective conductor that must be attached to some particular binding post other than by striping the overall jacket from the cable or by gauging the position of the objective conductor relative to the remaining wires in the cable. This latter method is unfeasible where there are many conductors or where one side or edge of the cable cannot be distinguished from the other side or edge of the cable. Most wiring instructions furnished to electricians refer to the differing color of particular conductors in a cable as a means of designating which conductors are to be attached to certain binding posts of electrical apparatus. In a cable having an opaque overall jacket such jacket obviously must be stripped from the cable before the color of the individual inner conductors can be known. In most cases this requires unjacketing of the entire perimeter of the cable in order to locate the proper conductor or in order to connect the same to a binding post or to a branch wire or wires.

It is an object of this invention so to construct a cable of plural wires that any objective conductor within the cable may be identified by its distinguishing appearance at any point along the cable without stripping the outermost substance from the cable.

A further object is to be able to separate a length of any conductor or conductors, so identified, laterally from all other conductors of the cable without baring any metallic wire of the conductors.

A contributory object is to bond separably together by means of an overall coating forming a flexible band of transparent homogeneous material, a group of differently colored parallel conductors in a manner to constitute a flexible cable, while leaving the different colors of the individual conductors plainly distinguishable through the outermost transparent material throughout the length of the cable.

It is a further object to make possible the "peeling" apart of selected conductors, or of an objective conductor away from other conductors of such a cable, by finger manipulation alone and without the use of tools. To this end the invention aims to join together adjacent differently colored conductors by means of an easily ruptured web formed from the same transparent band material that is extraneous to differently colored sheathings of the individual wires in the various conductors.

The foregoing and other objects of the present improvements will become clear in greater particular from the following description of an illustrative embodiment of the invention having reference to the accompanying drawings wherein:

Fig. 1 is a view of a terminal portion of the improved cable showing free ends of two of its conductors separated from the remaining conductors.

Fig. 2 shows one of the conductors of the cable parted from the others at a mean point in the length of the cable.

Fig. 3 is a view drawn on an enlarged scale taken in section on the plane 3—3 in Fig. 1 looking in the direction of the arrows.

Fig. 4 shows the improved cable of Figs. 1 and 3 emerging from the die head of a plastic extruding machine.

Fig. 5 is a view looking in the direction of arrow 5 in Fig. 4 at the empty extrusion orifice, a section of the jacket forming die being broken away.

Fig. 6 is a view taken in section on the plane 6—6 in Fig. 5 looking in the direction of the arrows.

Referring in greater detail to the drawings, Figs. 4, 5 and 6 represent the die head of a conventional plastic extrusion machine modified in shape of orifice to play out progressively and simultaneously in continuing lengths a plurality of neighboring parallel metallic conductive wires 12 having duplex insulative coverings. For simplicity of illustration it may be assumed that each of wires 12 has already been sheathed by an inner insulative coat to constitute what will hereinafter be termed a conductor before traveling from right to left in Fig. 6 and emerging from outlet orifice 13 in the conductor guiding or core tube 14. This rigid core tube may be frame mounted in fixed relation to the die block 15. Core tube 14 has a series of outlet orifices, one for each conductor such as those numbered 13, in its wedge-shaped nose 16. This nose points centrally toward an elongated, slot-like, ejection orifice 17 in die block 15. The elongated edges of orifice 17 are formed with spaced pairs of opposed shark-teeth ridges 18 which point toward each other but are separated to an extent leaving a weakened bonding web 25 in the outer of the aforementioned duplex insulative covering of the cable conductors. These duplex conductor coverings are shown in Figs. 1 to 4 of the drawings and their novel purpose and function will now be explained.

First, the metallic wires 12 are furnished individually with the aforesaid inner insulative coverings of contrasting external appearance. While this contrast in appearance might be accomplished by braiding the wires with textile strands of different colors, different woven patterns, or different degrees of coarseness, I prefer for reasons hereinafter mentioned, to coat each wire with a different color of thermoplastic material so that the wire covered with black thermoplastic will comprise conductor 19, the wire covered with red will comprise conductor 20, the wire covered with yellow will comprise conductor 21 and the wire covered with green will comprise conductor 22.

These wires may thus be insulated within individual insulative sheaths of solid material of different coloring either simultaneously as they travel through respectively different passageways in the core tube 14 leading to outlet orifices 13 in the nose thereof, or they may be sheathed singly within their individual insulative coverings by any separate conventional process prior to being fed into these core tube passageways. In the latter case it is not necessary that the inner differently colored thermoplastic coverings be applied to the wires by an extrusion process since any slower conventional processes may be employed such as that of wrapping a tape of insulative thermoplastic of the desired color around the wire and then heating it to make a sealed colored covering.

Whatever be the nature of the inner one of the aforementioned duplex conductor coverings it is proposed by this invention to superimpose upon and between such inner coverings or coats a homogeneous overall thermoplastic material 26 that forms a unitary band and is sufficiently transparent to expose to view therethrough the distinctive appearance or colorings of the coats of each of the individual wires, whereby a given conductor can be identified at random points in the length of the cable without stripping such transparent material from the cable.

Furthermore this overall band 26 of transparent material contains narrow deep grooves 27 in one or both of its flat opposite broadside faces sufficiently weakening the transparent thermoplastic material thereat to predetermine a course along which said material may be torn apart by finger manipulation without the use of tools. These grooves are sunk toward each other from opposite broadside faces of the belt into sufficient proximity to leave between them a thickness of the belt reduced to less than the cross-sectional size of the wire 12 and its colored coat 19, 20, etc. In the extrusion process hereinbefore proposed such grooves will be formed by the shark-teeth 18 of the die orifice 17 in an arrangement wherein aligned grooves are sunk toward each other in opposite broadside faces of the jacket and extend between and parallel with the conductors. This leaves the weakened webs 25 of the transparent thermoplastic jacket constituting bonding means joining the outer of the aforesaid duplex coatings of the wires which webs constitute easily ruptured thin partitions separating the inner differently colored coverings of the wires from one another. In other words, the webs 27 are formed by transparent outer jacketing material sufficiently weakened in tensile strength along a line intermediate and parallel with neighboring conductors to enable the jacket to be split along said line by finger manipulation in a manner to flex one or more of the differently colored conductors away from its neighboring conductors as indicated in Fig. 1 without baring any wire or its colored covering.

The aforesaid outer covering 26 of transparent flexible thermoplastic material superimposed over the inner jackets of differently colored flexible thermoplastic material forms a flexible ribbon-like or band-like cable which may contain as many conductors as desired. The conductors may also be arranged in double or single rows and the outside of the cable may be of round or polyhedral cross-sectional shape if the conductors are clustered in a manner to produce such profile shapes of the cable.

Fig. 2 illustrates one particular advantage of this improved construction of cable by showing a conductor 20 of selected color bowed laterally toward the left or in other words pulled out of line with its neighboring conductors, the transparent webs 25 being ruptured over a short stretch of their lengths by finger manipulation of the cable. At its bowed away point 31 the wire 12 of conductor 20 is accessible to be bared for connection to a branch wire 30 or to some binding post of a piece of electrical apparatus (not shown).

Among the many thermoplastics which may be transparent and lend themselves to the formation of the band 26 by extrusion methods or other processes may be mentioned vinyl resins among which polymers of vinyl chloride and copolymers of vinyl acetate with vinyl chloride or vinyl chloride with vinylidene chloride are popular. Styrene resins have very good light transmitting qualities and do not char. The use of any flexible and transparent or sufficiently translucent plastic to exhibit the different colors of the inside conductors is within the scope of this invention. Stabilizers may be added that will retard chemical break down of the polymer as well as improve the electrical properties. The form of this material as supplied to the extruder may be tape, batch, sheet or granules. The material of the jacket may be applied by extrusion as before described or by dipping the grouped conductors in thermoplastic heated to a liquid consistency or by wrapping the grouped conductors in thermoplastic tape, then heating and finally cooling.

If elastic properties are desired 10% to 40% of plasticizers may be added. This will render the dimensions of the jacket more stable. As an example of dimensions suitable to the hereinbefore mentioned purpose of building electric circuits in toy electric railway systems, four strands of No. 22 single strand tinned wire individually coated with .015″ walls of black, red, yellow and green thermoplastic coverings respectively may lie side by side in a flat band-like cable measuring approximately in overall dimensions $\frac{1}{16}″ \times \frac{5}{16}″$, all dimensions being approximate and subject to small or large variations within the concept of this invention. Proper regulation of heat along core tube 16 and die head 15 will enable the jacket material to become firmly bonded to the conductor coverings as a result of the jacket extruding process.

From the foregoing description it will be seen that a cable constructed as herein illustrated and described embodies an elongated flexible band of insulative material comprising throughout said band an integral body of homogeneous substance having internally disposed laterally spaced differently colored veins of the same substance extending side by side longitudinally of the band and having relatively transparent outer portions of the substance which envelope and intervene between the differently colored veins 19, 20, 21 and 22.

The appended claims are directed to and intended to cover all variations of and substitutes for the particular form of cable construction herein illustrated that fall fairly within the broadest interpretation of the claim language.

I claim:

1. An electric cable adapted to be divided in longitudinal direction by finger manipulation, embodying in combination, an elongated flexible band of insulative material comprising throughout said band an integral body of homogeneous substance having internally disposed laterally spaced differently colored veins of said substance extending side by side longitudinally of the band and having relatively transparent outer portions of said substance enveloping and intervening between said differently colored veins, and a plurality of conductive wires fixedly embedded in and enveloped respectively by said differently colored veins, at least one of said intervening transparent body portions being sufficiently weaker along an intermediate line running beside and spaced from said veins thereby to part more readily along said line than elsewhere whereby each of said veins remains completely enveloped by a transparent sheath of the body substance when the band is forcefully parted along said line by finger manipulation.

2. An electric cable adapted to be divided in longitudinal direction by finger manipulation, embodying in combination, an elongated flexible band of insulative material comprising throughout said band an integral body of homogeneous thermoplastic substance having internally disposed laterally spaced differently colored veins of said substance extending side by side longitudinally of the band and having relatively transparent outer portions of said substance enveloping and intervening between said differently colored veins, and a plurality of conductive wires fixedly embedded in and enveloped respectively by said differently colored veins, at least one of said intervening transparent body portions being sufficiently reduced in thickness along an intermediate line running beside and spaced from said veins to enable said transparent body portion to part more readily along said line than elsewhere, whereby each of said veins remains completely enveloped by a transparent sheath of the body substance when the band is forcefully parted along said line by finger manipulation.

3. An electric cable adapted to be divided in longitudinal direction by finger manipulation, embodying in combination, an elongated flexible band of insulative material comprising throughout said band an integral body of homogeneous thermoplastic substance having internally disposed laterally spaced differently colored veins of said substance extending longitudinally of the band and having relatively transparent outer portions of said substance enveloping and intervening between said differently colored veins, and a plurality of conductive wires fixedly embedded in and enveloped respectively by said differently colored veins, at least one of said intervening transparent body portions being weakened in thickness by a groove of sufficient width and depth to be sensed and entered by a finger nail of the user intermediate and spaced from said veins thereby to enable said band to part more readily along said groove than elsewhere, whereby each of said veins remains completely enveloped by a transparent sheath of the body substance when the band is forcefully parted by finger manipulation.

4. An electric cable adapted to be divided in longitudinal direction by finger manipulation, embodying in combination, an elongated flexible band of insulative substance comprising throughout said band an integral body of homogeneous thermoplastic substance having internally disposed laterally spaced differently colored veins of said substance extending longitudinally of the band and having relatively transparent outer portions of said substance enveloping and intervening between said differently colored veins, and a plurality of conductive wires fixedly embedded in and enveloped respectively by said differently colored veins, at least one of said intervening transparent body portions being weakened in thickness by two grooves intermediate and spaced from said colored veins sunk toward each other from opposite broadside faces of the band into sufficient mutual proximity to leave between said grooves a thickness of said transparent substance less than the thickness of said colored veins, whereby said veins remain completely enveloped by a transparent sheath of the body substance when the band is forcefully parted by finger manipulation.

MARSHALL H. FRISBIE.

REFERENCES CITED

The following references are of record in the file of this patent:

UNITED STATES PATENTS

| Number | Name | Date |
|---|---|---|
| 286,829 | Kohmescher | Oct. 16, 1883 |
| 1,698,704 | Middleton et al. | Jan. 8, 1929 |
| 1,729,160 | Engle | Sept. 24, 1929 |
| 1,914,097 | Barker | June 13, 1933 |
| 1,956,951 | Hinsky | May 1, 1934 |
| 1,968,903 | Norton | Aug. 7, 1934 |
| 2,076,711 | Eagleson | Apr. 13, 1937 |
| 2,089,774 | Wachstein | Aug. 10, 1937 |
| 2,123,746 | Rost | July 12, 1938 |
| 2,178,365 | Brobst | Oct. 31, 1939 |
| 2,361,374 | Abbott | Oct. 31, 1944 |
| 2,438,006 | Gustafson | Mar. 16, 1948 |

FOREIGN PATENTS

| Number | Country | Date |
|---|---|---|
| 321,118 | England | Oct. 31, 1929 |
| 401,529 | England | Nov. 16, 1933 |

OTHER REFERENCES

A publication, "Vinylite (Wire & Cable Insulation) Plastics," by Bakelite Corp., 30 E. 42d St., N. Y. C. (Copy received in U. S. Patent Office, April 10, 1945; pages 6 and 10.)